United States Patent [19]
Connelly

[11] Patent Number: 5,280,816
[45] Date of Patent: Jan. 25, 1994

[54] TIRE SIDEWALL PROTECTOR

[76] Inventor: Ernest M. Connelly, 2588 Friendly St., Eugene, Oreg. 97405

[21] Appl. No.: 904,942

[22] Filed: Jun. 26, 1992

Related U.S. Application Data

[63] Continuation-in-part of Ser. No. 640,211, Jan. 11, 1991.

[51] Int. Cl.$^5$ .............................................. B60C 27/06
[52] U.S. Cl. .................................. 152/243; 152/245; 152/239; 59/85; 59/93
[58] Field of Search ............... 152/208, 217, 218, 219, 152/231, 233, 234, 235, 239, 240, 241, 242, 213 A, 245, 243; 59/85, 93; 24/68 CT, 68 CD, 69 ST, 70 TT, 116 R

[56] References Cited

U.S. PATENT DOCUMENTS

| | | | |
|---|---|---|---|
| 2,143,784 | 1/1939 | Lindberg | 152/239 |
| 2,186,528 | 1/1940 | Hurst | 152/233 |
| 2,249,695 | 7/1941 | Elliott | 152/239 |
| 2,658,547 | 11/1953 | Perlman | 152/233 |
| 2,664,608 | 1/1954 | Beck | 152/241 |
| 4,825,923 | 5/1989 | Blankenship et al. | 152/213 A |

Primary Examiner—Michael W. Ball
Assistant Examiner—Francis J. Lorin
Attorney, Agent, or Firm—James D. Givnan, Jr.

[57] ABSTRACT

A plate for placement between a tire chain and a tire sidewall to protect the sidewall. Lockable ties pass through plate openings and chain links to hold the plate in place. A second form of the plate utilizes locks integral with the plate and which pass through openings in a retainer which is integral with the plate. The locks are biased into retainer engagement. A further form of the protector utilizes posts which extend through a retainer with lockable ties on the posts preventing retainer disengagement.

4 Claims, 1 Drawing Sheet

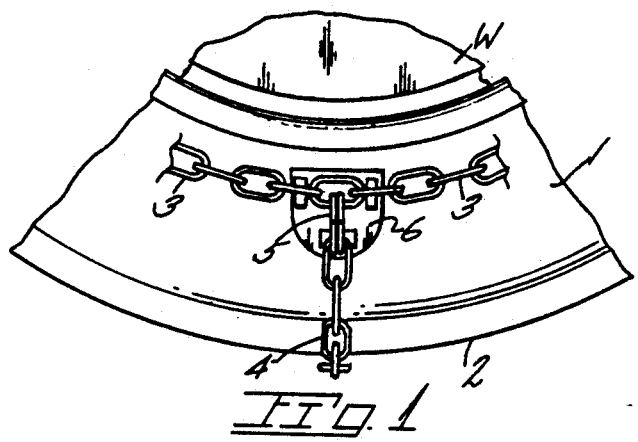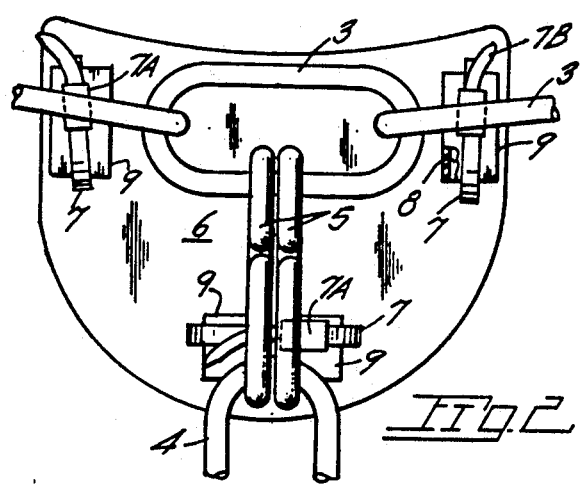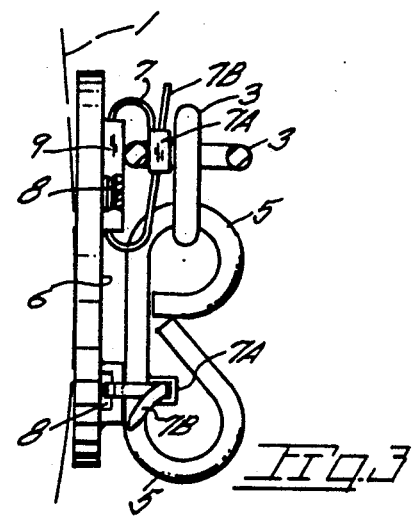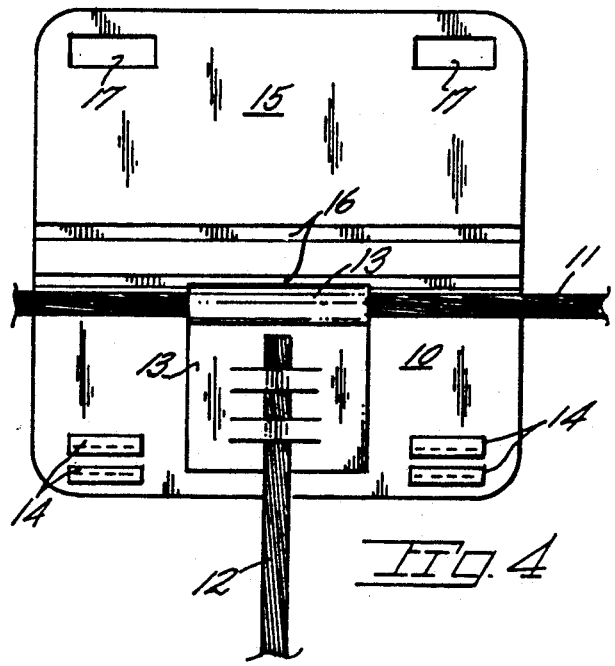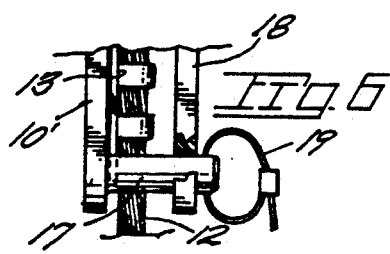

TIRE SIDEWALL PROTECTOR

BACKGROUND OF THE INVENTION

This is a continuation-in-part of ending application 07/640,211 filed Jan. 11, 1991.

The present invention pertains generally to the provision of a protective device disposed between a tire sidewall and a tire chain or a cable device applied to the tire for traction purposes.

The use of tire chains, or similar devices of cable construction, results in the sidewalls of a tire being subjected to abrasion. Operation of a tire so equipped for a substantial period of time results in chain (or cable) components permanentaly marking the sidewall. Such markings on a tire sidewall detract from tire appearance and in severe cases damages the tire sidewall surface.

Typically such wear occurs on a tire sidewall at the intersection of cross chain segments and the continuous chain components extending about the tire sidewall.

SUMMARY OF THE PRESENT INVENTION

The present invention is embodied within a protective device for attachment to a tire traction enhancing component with the device supported in place at the intersection of chain components.

A protective plate is provided which is equipped with locking means engageable with tire chain elements to hold the plate in place. A suitable locking means utilizes flexible ties of sturdy synthetic material such as nylon. The ties are in insertable engagement with openings in the plate and tire chain elements.

Important objectives include the provision of a tire sidewall protector for placement intermediate a tire chain and a tire sidewall to protect the sidewall and to identify the chain as by color coding or otherwise identifying of the tire chain size; the provision of a protector that identifies the tire side of the chain to aid the user in proper installation of the chain; the provision of a protector for tire sidewalls which may be transferred from one tire chain to another by use of low cost, disposable cable ties; the provision of a sidewall protector readily attachable to a tire chain for disposition against a tire sidewall to prevent damage to the latter; the provision of a tire sidewall protector that is readily joined with a tire chain at those points where sidewall damage or abrasion would otherwise be done by the tire chain; the provision of a tire sidewall protector that is particularly suited for certain tire chains, termed cable chains by the public, wherein steel cable is utilized instead of chain links.

BRIEF DESCRIPTION OF THE DRAWINGS

In the accompanying drawings:

FIG. 1 is a fragmentary elevational view of an automobile tire, wheel and tire chain with the present tire sidewall protector in place;

FIG. 2 is an elevational view of the present sidewall protector with associated chain segments;

FIG. 3 is a side elevational view taken from the left side of FIG. 2;

FIG. 4 is an elevational view similar to FIG. 2 but showing a modified protector for use on a traction enhancing device of cable construction;

FIG. 5 is a side elevational view of FIG. 4 taken from the left side thereof and with the protector folded into an operative position;

FIG. 6 is a view similar to FIG. 5 but showing a modified locking arrangement.

DETAILED DESCRIPTION OF THE PREFERRED EMBODIMENTS

With continuing attention to the drawings wherein reference numerals indicate parts similarly hereinafter identified, the reference numeral 1 indicates a tire sidewall with a tire tread at 2. An automotive wheel is indicated at W. A continuous, latch equipped chain member 3 extends along the tire sidewall as does a companion chain member (not shown) in place against the remaining tire sidewall of FIG. 1. Conventional tire chains include cross chain segments 4 at intervals about the tire periphery with their ends fastened to side chain members as at 3 by kook shaped links 5 as typically shown in FIG. 1.

A tire sidewall protector includes a plate 6. Locking means on each plate includes an elongate flexible cable tie 7 which passes through a chain link and through an opening 8 in the plate. The ties 7 are preferably of one piece molded nylon construction and of the type including a lock 7A which receives the inserted or free end 7B of flexible tie 7 with the lock 7A preventing removal of the end segment. Such ties are in wide use in a number of industrial applications including the bundling of electrical cables or conductors. Openings 8 are preferably formed by U-shaped appendages 9 on plate 6.

A modified sidewall protector plate at 10 includes a plate 10 for installation between a continuous cable indicated at 11 and a tire sidewall I shown in FIG. 5. Cross cables as at 12 are spaced about the tire periphery. Such cable chains include a connector device at 13 joining the cross cables as at 12 with the continuous cable 11 which extends along the tire sidewall. A companion continuous, latched cable extends about the remaining or unseen tire sidewall. Plate 10 of the modified sidewall protector serves to isolate tire sidewall 1 from damaging contact with connector 13.

Locking means of the modified sidewall protector includes locks 14 on plate 10 which serve to secure a retainer 15 in place over connector 13. Grooves at 16 serve as hinge means and facilitate displacement of the retainer into place over connector 13 so as to permit registration of the retainer openings 17 with the locks 14. Locks 14 may be suitably embodied in latches each having a head 14A for retentive engagement with retainer 15. For this purpose, the enlarged heads 14A have shoulders at 14B for overlying engagement with a retainer edge. The locks are shown in pairs with the locks of a pair inherently biased in opposite directions to insure locking engagement with retainer 15. A second locking means may be alternatively provided on the modified sidewall protector 10' in FIG. 6 and includes a post member 17 engaged by a folded over retainer 18 with the post end being transversely apertured to receive an elongate flexible tie 19 of the type earlier described to prevent disengagement of the retainer from the post. The retainer 18 is apertured to receive post 17.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. In combustion, a plate for protecting the sidewall of a tire, said plate having a first surface for abutment with the tire sidewall and a second surface for outward disposition relative the tire sidewall, means on said second surface defining multiple openings, a tire chain for placement about the tire and having side chains and cross chains connected at intervals along the side chains, and elongate plastic ties each for individual insertion through said openings and for passage about a portion of said side chains and said cross chains, said ties each including an end segment and a lock into which said end segment is inserted for locking in place said end segment of the tie so as to retain the plate in place on said tire chain.

2. The combination claimed in claim 1 wherein said means on said plate defining multiple openings are V-shaped appendages.

3. In combination, a plate for protecting the sidewall of a tire, said plate having a first surface for abutment with the tire sidewall and a second surface for outward disposition relative the tire sidewall, a tire chain for placement about the tire and having a side chain member for placement along the tire sidewall and cross chain segments for placement across the tread of said tire, and locking means on said second surface for securing said plate to said side chain member and to one of said cross chain segments and including a retainer hingedly carried by said plate and defining openings, and locks projecting from said second surface and being insertable through said openings for locking engagement with said retainer.

4. The combination claimed in claim 3 wherein said locks each includes a post insertable into a respective opening in the retainer and an elongate flexible plastic tie in inserted engagement with the post to confine the retainer thereon.

* * * * *